US012782835B2

(12) United States Patent
Yamakoshi et al.

(10) Patent No.: US 12,782,835 B2
(45) Date of Patent: Nov. 3, 2026

(54) CONDUCTIVE MEMBER, CHARGING DEVICE, PROCESS CARTRIDGE, AND IMAGE FORMING APPARATUS

(71) Applicant: FUJIFILM Business Innovation Corp., Tokyo (JP)

(72) Inventors: Kenta Yamakoshi, Kanagawa (JP); Yukimi Kawabata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 514 days.

(21) Appl. No.: 18/457,898

(22) Filed: Aug. 29, 2023

(65) Prior Publication Data

US 2024/0319622 A1 Sep. 26, 2024

(30) Foreign Application Priority Data

Mar. 24, 2023 (JP) ................................. 2023-049075

(51) Int. Cl.

*G03G 5/10* (2006.01)
*G03G 15/02* (2006.01)

(52) U.S. Cl.

CPC ......... *G03G 5/105* (2013.01); *G03G 15/0233* (2013.01)

(58) Field of Classification Search

CPC ........................... G03G 5/105; G03G 15/0233
See application file for complete search history.

(56) References Cited

FOREIGN PATENT DOCUMENTS

| | | | | |
|---|---|---|---|---|
| EP | 2180376 | A2 * | 4/2010 | ......... G03G 15/0233 |
| JP | 2011-022410 | A | 2/2011 | |
| JP | 2017-015952 | A | 1/2017 | |

* cited by examiner

*Primary Examiner* — Peter L Vajda
*Assistant Examiner* — Jenna Kuipers
(74) *Attorney, Agent, or Firm* — Sughrue Mion, PLLC

(57) ABSTRACT

A conductive member includes: a substrate; an elastic layer provided on the substrate; and a surface layer provided on the elastic layer, in which the surface layer contains a conductive agent and has a sea/island structure that includes a sea portion containing a first resin and an island portion containing a second resin, and in observation of a cross-section of the surface layer, an area ratio A of island portions in a region A from a surface of the surface layer to a depth that is 20% of a film thickness is 25% or more and 45% or less.

20 Claims, 3 Drawing Sheets

CONDUCTIVE MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-049075 filed Mar. 24, 2023.

BACKGROUND

(i) Technical Field

The present invention relates to a conductive member, a charging device, a process cartridge, and an image forming apparatus.

(ii) Related Art

JP2011-22410A discloses "a conductive member including: a substrate; an elastic layer disposed on the substrate; and a surface layer disposed on the elastic layer, the surface layer having a sea/island structure that consists of a sea portion containing a first resin and an island portion containing a second resin, and the surface layer containing carbon black at least in the island portion."

JP2017-15952A discloses "a conductive member including: a substrate; an elastic layer provided on the substrate; and a surface layer provided on the elastic layer, in which the surface layer has a sea/island structure that consists of a sea portion containing at least a first resin and a conductive agent and an island portion containing at least a second resin, an average diameter of the island portion is 100 nm or more and not more than ⅒ a thickness of the surface layer, and the conductive agent in the sea portion is unevenly distributed in the vicinity of an interface between the sea portion and the island portion."

SUMMARY

Aspects of non-limiting embodiments of the present disclosure relate to a conductive member that includes: a substrate; an elastic layer provided on the substrate; and a surface layer provided on the elastic layer, in which the surface layer contains a conductive agent and has a sea/island structure that includes a sea portion containing a first resin and an island portion containing a second resin, and a conductive member where a mechanical strength is ensured and the occurrence of color streaks is suppressed as compared to a case where in observation of a cross-section of the surface layer, an area ratio A of island portions in a region A from a surface of the surface layer to a depth that is 20% of a film thickness is less than 25% or more than 45%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the objects include the following aspects.

According to an aspect of the present disclosure, there is provided a conductive member including:

a substrate;

an elastic layer provided on the substrate; and a surface layer provided on the elastic layer, in which the surface layer contains a conductive agent and has a sea/island structure that consists of a sea portion containing a first resin and an island portion containing a second resin, and in observation of a cross-section of the surface layer, an area ratio A of island portions in a region A from a surface of the surface layer to a depth that is 20% of a film thickness is 25% or more and 45% or less.

BRIEF DESCRIPTION OF THE DRAWINGS

Exemplary embodiment(s) of the present invention will be described in detail based on the following figures, wherein.

DETAILED DESCRIPTION

Figure 1:
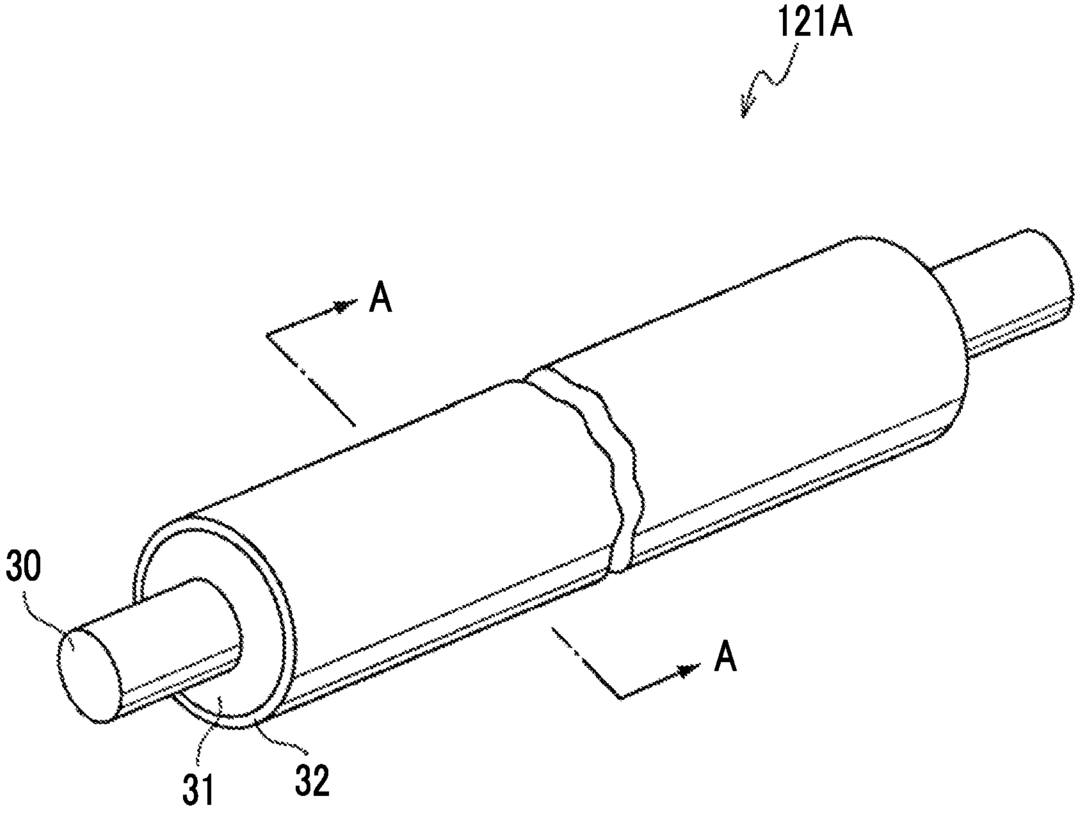
FIG. 1 is a schematic perspective view showing one example of a conductive member according to an exemplary embodiment.

Hereinafter, an exemplary embodiment that is one example of the present invention will be described. The following description and Examples merely illustrate the present exemplary embodiment and do not limit the scope of the present invention.

An upper limit value or a lower limit value described in one numerical range described in a stepwise manner in the present specification may be replaced with an upper limit value or a lower limit value in another numerical range described in a stepwise manner. In addition, an upper limit value and a lower limit value in a numerical range described in the present specification may be replaced with a value described in examples.

Each of components may include plural kinds of corresponding materials.

In a case where the amount of each of components in a composition is described and plural kinds of materials corresponding to the component are present, unless specified otherwise, the amount of the component refers to the total amount of the plural kinds of materials present in the composition.

Conductive Member

A conductive member according to the present exemplary embodiment includes: a substrate; an elastic layer provided on the substrate; and a surface layer provided on the elastic layer.

In addition, the surface layer contains a conductive agent and has a sea/island structure that consists of a sea portion containing a first resin and an island portion containing a second resin, and in observation of a cross-section of the surface layer, an area ratio A of the island portions containing the second resin in a region A from a surface of the surface layer to a depth that is 20% of a film thickness is 25% or more and 45% or less.

In the conductive member according to the present exemplary embodiment, with the above-described configuration, the mechanical strength is ensured, and the occurrence of color streaks is suppressed. The reason for this configuration is presumed to be as follows.

There is known a conductive member including: a substrate; an elastic layer provided on the substrate; and a surface layer provided on the elastic layer, in which the surface layer contains a conductive agent and has a sea/island structure that includes a sea portion containing a first resin and an island portion containing a second resin.

However, in a case where the surface layer is formed, the coating film is rapidly dried from the surface layer. Therefore, the ratio of the island portions in the outermost layer of the surface layer decreases. The reason for this configuration is presumed to be that the two kinds of resins are separated by layers such that a period of time required to form the sea/island structure cannot be sufficiently ensured.

In a case where the ratio of the island portions in the outermost layer of the surface layer is low, the current is not likely to flow through the outermost layer of the surface layer, and the conductivity as the conductive member tends to be low. As a result, in a case where the conductive member is used as a charging member, color streaks may occur. On the other hand, in a case where the amount of the second resin in the surface layer increases excessively in order to facilitate the flow of a current in the outermost layer, the mechanical strength of the outermost layer decreases.

On the other hand, in the conductive member according to the present exemplary embodiment, in observation of a cross-section of the surface layer, an area ratio A of island portions in a region A from a surface of the surface layer to a depth that is 20% of a film thickness is adjusted to be 25% or more and 45% or less. As a result, the island portions are present in the outermost layer at an appropriate ratio, the mechanical strength is ensured, and the current is likely to flow.

As a result, it is presumed that, in the conductive member according to the present exemplary embodiment, the mechanical strength is ensured, and the occurrence of color streaks is suppressed.

Hereinafter, the conductive member according to the present exemplary embodiment will be described in detail.

Figure 2:
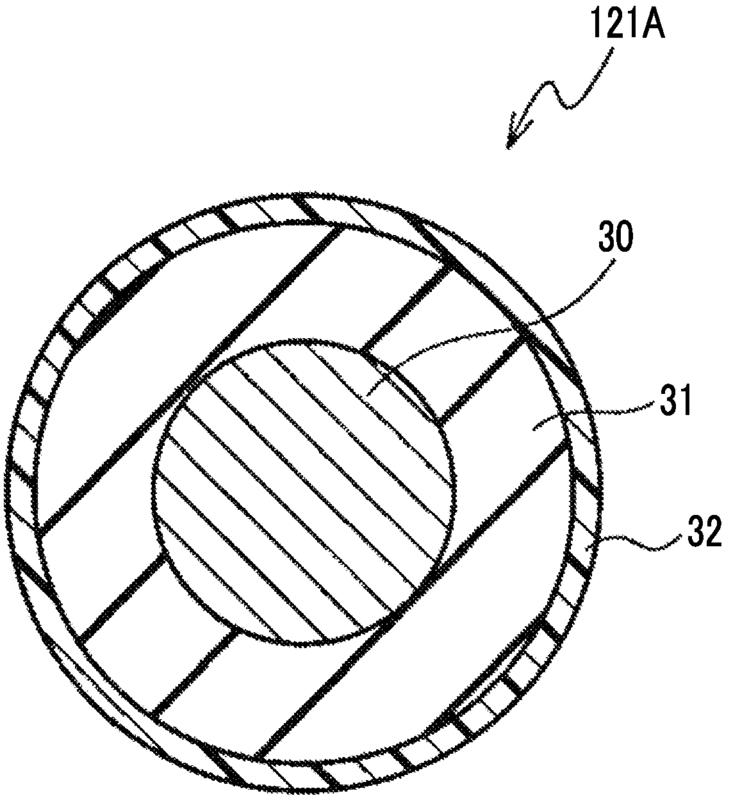
FIG. 2 is a schematic cross-sectional view showing the example of the conductive member according to the present exemplary embodiment and is an A-A cross-sectional view of FIG. 1.

FIG. 1 is a schematic perspective view showing one example of the conductive member according to the present exemplary embodiment. FIG. 2 is a schematic cross-sectional view showing the example of the conductive member according to the present exemplary embodiment. FIG. 2 is an A-A cross-sectional view of FIG. 1.

As shown in FIGS. 1 and 2, for example, a conductive member 121A according to the present exemplary embodiment is a roll-shaped member including a shaft 30 (an example of the substrate), an elastic layer 31 provided on an outer peripheral surface of the shaft 30, and a surface layer 32 provided on an outer peripheral surface of the elastic layer 31.

Hereinafter, each of the components in the conductive member according to the present exemplary embodiment will be described in detail. Note that a reference numeral given to each of the components will not be described in some cases.

Substrate

The substrate is a cylindrical or columnar conductive member, and the conductivity described herein refers to a volume resistivity of less than $10^{13}$ Ωcm.

Examples of a material of the substrate include metal such as iron (for example, free-cutting steel), copper, brass, stainless steel, aluminum, or nickel. Examples of the substrate include a member (for example, a resin or ceramic member) where an outer peripheral surface is plated and a member (for example, a resin or ceramic member) where a conductive agent is dispersed.

Elastic Layer

The elastic layer contains, for example, an elastic material, a conductive agent, and other additives.

Examples of the elastic material include isoprene rubber, chloroprene rubber, epichlorohydrin rubber, butyl rubber, polyurethane, silicone rubber, fluororubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and blended rubbers thereof. In particular, for example, polyurethane, silicone rubber, EPDM, epichlorohydrin-ethylene oxide copolymer rubber, epichlorohydrin-ethylene oxide-allyl glycidyl ether copolymer rubber, NBR, or blended rubbers thereof are preferable. These elastic materials may be foamed or unfoamed.

Examples of the conductive agent include an electronic conductive agent and an ionic conductive agent. Examples of the electronic conductive agent include powders of: carbon black such as Ketjen black or acetylene black; pyrolytic carbon or graphite; conductive metals or alloys such as aluminum, copper, nickel, or stainless steel; conductive metal oxides such as tin oxide, indium oxide, titanium oxide, tin oxide-antimony oxide solid solution, or tin oxide-indium oxide solid solution; and an insulating material having a surface that is treated to be conductive. Examples of the ionic conductive agent include perchlorates or chlorates of oniums such as tetraethylammonium or lauryltrimethylammonium; and perchlorates or chlorates of alkali metals or alkali earth metals such as lithium or magnesium. The conductive agents may be used alone or in combination of two or more kinds.

Specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" manufactured by Orion Engineered Carbons S.A. and "MONARCH 880", "MONARCH 1000", "MONARCH 1300", "MONARCH 1400", "MOGUL-L", and "REGAL 400R" manufactured by Cabot Corporation.

The blending amount of the conductive agent is not particularly limited and, in the case of the electronic conductive agent, for example, is desirably in a range of 1 part by mass or more and 30 parts by mass or less and more preferably in a range of 15 parts by mass or more and 25 parts by mass or less with respect to 100 parts by mass of the elastic material. The blending amount of the ionic conductive agent is, for example, desirably in a range of 0.1 parts by mass or more and 5.0 parts by mass or less and more preferably in a range of 0.5 parts by mass or more and 3.0 parts by mass or less with respect to 100 parts by mass of the elastic material.

Examples of other additives that are blended in the elastic layer include typical materials that can be blended in the elastic layer, for example, a softener, a plasticizer, a curing agent, a vulcanizing agent, a vulcanization accelerator, an antioxidant, a surfactant, a coupling agent, and a filler (for example, silica or calcium carbonate).

The average thickness of the elastic layer is, for example, desirably about 1 mm or more and 15 mm or less and more preferably about 2 mm or more and 10 mm or less.

The volume resistivity of the elastic layer is, for example, preferably $10^3$ Ωcm or higher and $10^{14}$ Ωcm or lower.

Surface Layer

Composition of Surface Layer

The surface layer contains a conductive agent and has a sea/island structure that consists of a sea portion containing a first resin and an island portion containing a second resin.

Here, "sea/island structure" refers to a structure where at least two resins are mixed in an incompatible state and the island portion as a dispersed phase is provided in the sea portion as a continuous phase.

The sea/island structure is formed by adjusting a difference in solubility parameter (SP value) between the first resin and the second resin and a mixing ratio between the first resin and the second resin. From the viewpoint of easily forming the sea/island structure, the difference in SP value between the first resin and the second resin is, for example, preferably 2 or more and 10 or less.

The mixing ratio between the first resin and the second resin will be described below.

A method of calculating the solubility parameter (SP value) is a method described in "Polymer Handbook 4th Edition, John Wiley & Sons" VII 680 to 683. The solubility parameters of major resins are described in VII 702 to 711 of the document.

Examples of the first resin include an acrylic resin, a cellulose resin, a polyamide resin, copolymer nylon, a polyurethane resin, a polycarbonate resin, a polyester resin, a polyethylene resin, a polyvinyl resin, a polyarylate resin, a styrene-butadiene resin, a melamine resin, an epoxy resin, a urethane resin, a silicone resin, a fluororesin (for example, a tetrafluoroethylene perfluoroalkyl vinyl ether copolymer, a polytetrafluoroethylene-hexafluoropropylene copolymer, or polyvinylidene fluoride), and a urea resin. The copolymer nylon is a copolymer containing any one kind or plural kinds among nylon 610, nylon 11, and nylon 12 as polymerization units, and may further contain nylon 6 or nylon 66 as other polymerization units. As the first resin, the elastic material that is blended in the elastic layer may be applied. As the first resin, one kind of resin may be used alone, or two or more kinds of resins may be used in combination.

As the first resin, from the viewpoints of: electrical characteristics or contamination resistance of the surface layer; appropriate hardness or maintainability of the surface layer in a case where the surface layer is provided on the elastic layer; and dispersion suitability or coating film formability of the conductive agent in a case where the surface layer is formed using a dispersion liquid, for example, a polyamide resin (for example, nylon) is preferable, and a methoxymethylated polyamide resin (for example, methoxymethylated nylon) is more preferable.

Examples of the second resin include a polyvinyl butyral resin, a polystyrene resin, and polyvinyl alcohol. As the second resin, one kind of resin may be used alone, or two or more kinds of resins may be used in combination.

As the second resin, from the viewpoints of: electrical characteristics or contamination resistance of the surface layer; appropriate hardness or maintainability of the surface layer in a case where the surface layer is provided on the elastic layer; and dispersion suitability or coating film formability of the conductive agent in a case where the surface layer is formed using a dispersion liquid, for example, a polyvinyl butyral resin is preferable.

Examples of the conductive agent include an electronic conductive agent and an ionic conductive agent. Examples of the electronic conductive agent include powders of: carbon black such as Ketjen black or acetylene black; pyrolytic carbon or graphite; conductive metals or alloys such as aluminum, copper, nickel, or stainless steel; conductive metal oxides such as tin oxide, indium oxide, titanium oxide, tin oxide-antimony oxide solid solution, or tin oxide-indium oxide solid solution; and an insulating material having a surface that is treated to be conductive. Examples of the ionic conductive agent include perchlorates or chlorates of oniums such as tetraethylammonium or lauryltrimethylammonium; and perchlorates or chlorates of alkali metals or alkali earth metals such as lithium or magnesium. The conductive agents may be used alone or in combination of two or more kinds.

As the conductive agent, for example, carbon black is suitable.

By using carbon black as the conductive agent, the conductive member is more likely to be obtained, in which the occurrence of axial color streaks during formation of an image is further suppressed. The reason for this configuration is presumed to be as follows.

Carbon black is more likely to be unevenly distributed in the vicinity of the region of the island portions of the surface layer as compared to a conductive agent other than carbon black. Therefore, by adjusting the diameter of the island portion to be 100 nm or more and 750 nm or less, an effect of increasing the area of a conductive path in the surface layer is further improved.

Accordingly, it is presumed that, by using carbon black as the conductive agent, the conductive member is more likely to be obtained, in which the occurrence of axial color streaks during formation of an image is further suppressed.

Examples of the carbon black include Ketjen black, acetylene black, and oxidized carbon black having a pH of 5 or less. More specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" manufactured by Orion Engineered Carbons S.A. and "MONARCH 880", "MONARCH 1000", "MONARCH 1300", "MONARCH 1400", "MOGUL-L", and "REGAL 400R" manufactured by Cabot Corporation.

The average particle size of the carbon black is, for example, preferably 15 nm or more and 30 nm or less, more preferably 15 nm or more and 25 nm or less, and still more preferably 15 nm or more and 20 nm or less.

By adjusting the average particle size of the carbon black to be 15 nm or more and 30 nm or less, the conductive member is more likely to be obtained, in which the occurrence of axial color streaks during formation of an image is further suppressed. The reason for this configuration is presumed to be as follows.

By adjusting the average particle size of the carbon black to be 15 nm or more and 30 nm or less, carbon black particles are more dense and are more likely to be unevenly distributed in the vicinity of the region of the island portions of the surface layer. As a result, a current is more likely to flow between the conductive agent particles. As a result, by adjusting the diameter of the island portion to be 100 nm or more and 750 nm or less, an effect of increasing the area of a conductive path in the surface layer is further improved.

Accordingly, it is presumed that the conductive member is more likely to be obtained, in which the occurrence of axial color streaks during formation of an image is further suppressed.

The average particle size of the carbon black is a value measured using a transmission electron microscope (TEM).

The measurement method is as follows.

First, the surface layer is cut using a microtome, and the obtained cross-section is observed with a transmission electron microscope (TEM). The diameter of a circle equivalent to the projected area of each of 50 particles of the carbon black is obtained as the particle size, and the average value thereof is obtained as the average particle size.

The content of the conductive agent is, for example, preferably 10 parts by mass or more and 15 parts by mass or less with respect to 100 parts by mass of the total mass of the first resin and the second resin.

By adjusting the content of the conductive agent to be 10 parts by mass or more and 15 parts by mass or less with respect to 100 parts by mass of the total mass of the first resin and the second resin, the conductive member is more likely to be obtained, in which the occurrence of axial color streaks during formation of an image is suppressed. The reason for this configuration is presumed to be as follows.

By adjusting the content of the conductive agent to be 10 parts by mass or more with respect to 100 parts by mass of the total mass of the first resin and the second resin, the amount of the conductive agent in the surface layer increases. A state where the conductive agent particles are close to each other is likely to be adopted, and a current is more likely to flow between the conductive agent particles. As a result, by adjusting the diameter of the island portion to be 100 nm or more and 750 nm or less, an effect of increasing the area of a conductive path in the surface layer is further improved.

By adjusting the content of the conductive agent to be 15 parts by mass or less with respect to 100 parts by mass of the total mass of the first resin and the second resin, the conductive agent is not likely to be scattered in the entire sea portion in the surface layer, a conductive path is not likely to be dispersed, and a decrease in conduction effect is suppressed.

Accordingly, it is presumed that the conductive member is more likely to be obtained, in which the occurrence of axial color streaks during formation of an image is further suppressed.

The content of the second resin is, for example, preferably 10 parts by mass or more and 30 parts by mass or less, more preferably 15 parts by mass or more and 25 parts by mass or less, and still more preferably 20 parts by mass or more and 25 parts by mass or less with respect to 100 parts by mass of a total mass of the first resin and the second resin.

By adjusting the content of the second resin to be 10 parts by mass or more and 30 parts by mass or less with respect to 100 parts by mass of the total mass of the first resin and the second resin, the conductive member is more likely to be obtained, in which the occurrence of axial color streaks during formation of an image is suppressed and the surface layer that is not likely to be fractured even after being repeatedly deformed. The reason for this configuration is presumed to be as follows.

By adjusting the content of the second resin to be 10 parts by mass or more with respect to 100 parts by mass of the total mass of the first resin and the second resin, the area occupancy of the island portions and the diameter of the island portion are likely to be in the desired numerical range. Therefore, the area of a conductive path in the surface layer is more likely to increase. In addition, by adjusting the content of the second resin to be 30 parts by mass or less with respect to the total mass of the surface layer, fracture of the surface layer caused by cracking that occurs at an interface between the island portion and the sea portion is further suppressed. As a result, the conductive member where the surface layer that is not likely to be fractured even after being repeatedly deformed is provided can be obtained.

Accordingly, it is presumed that the conductive member is more likely to be obtained, in which the occurrence of axial color streaks during formation of an image is suppressed and the surface layer that is not likely to be fractured even after being repeatedly deformed is provided.

The content of the second resin is, for example, preferably 11 parts by mass or more and 43 parts by mass or less, more preferably 15 parts by mass or more and 35 parts by mass or less, and still more preferably 20 parts by mass or more and 35 parts by mass or less with respect to 100 parts by mass of the first resin.

By adjusting the content of the second resin to be 11 parts by mass or more and 43 parts by mass or less with respect to 100 parts by mass of the first resin, the conductive member is more likely to be obtained, in which the occurrence of axial color streaks during formation of an image is suppressed and the surface layer that is not likely to be fractured even after being repeatedly deformed. The reason for this configuration is presumed to be as follows.

By adjusting the content of the second resin to be 11 parts by mass or more and 43 parts by mass or less with respect to 100 parts by mass of the first resin, the sea/island structure is likely to be formed, and the area occupancy of the island portions and the diameter of the island portion are likely to be in the desired numerical range. Therefore, the area of a conductive path in the surface layer is more likely to increase, and fracture of the surface layer caused by cracking that occurs at an interface between the island portion and the sea portion is further suppressed.

Accordingly, it is presumed that the conductive member is more likely to be obtained, in which the occurrence of axial color streaks during formation of an image is suppressed and the surface layer that is not likely to be fractured even after being repeatedly deformed is provided.

From the viewpoint of suppressing the occurrence of color streaks and obtaining fracture resistance, the total content of the first resin and the second resin is, for example, preferably 50 mass % or more and 95 mass % or less, more preferably 60 mass % or more and 90 mass % or less, and still more preferably 70 mass % or more and 85 mass % or less with respect to the total mass of the surface layer.

Area Ratio of Island Portions

In observation of a cross-section of the surface layer, an area ratio A of island portions in a region A from a surface of the surface layer to a depth that is 20% of a film thickness is 25% or more and 45% or less. From the viewpoints of suppressing a decrease in mechanical strength and suppressing the occurrence of color streaks, the area ratio A of the island portions is, for example, preferably 30% or more and 40% or less and more preferably 35% or more and 40% or less.

By adjusting the area ratio of the island portion in the entire surface layer to be in the appropriate range, the mechanical strength is ensured, and the occurrence of color streaks is likely to be suppressed.

From the viewpoints of suppressing a decrease in mechanical strength and suppressing the occurrence of color streaks, in the observation of the cross-section of the surface layer, an area ratio B of island portions in a region B from the surface of the surface layer to a depth that is more than 20% of the film thickness is, for example, preferably 40% or more and 50% or less, more preferably 42.5% or more and 50% or less, and still more preferably 45% or more and 50% or less.

In addition, from the viewpoints of suppressing a decrease in mechanical strength and suppressing the occurrence of color streaks, an absolute value of a difference between the area ratio A of the island portions and the area ratio B of the island portions is, for example, preferably within 15%, more preferably within 10%, and still more preferably within 5%.

The area ratio of the island portions is a value measured as follows.

A cut sample of the surface layer cut in a thickness direction using a cryomicrotome method is prepared. In the cut sample, a cut surface of the surface layer cut using a cryomicrotome method is observed with a scanning electron microscope.

In the observation image, the area of the region corresponding to the region A from the surface of the surface layer to the depth that is 20% of the film thickness, and the area of the island portions in the region A are measured. The ratio of the area of the island portions in the region A to the area of the region corresponding to the region A is calculated as the area ratio A of the island portions.

Likewise, the area of the region corresponding to the region B from the surface of the surface layer to the depth that is more than 20% of the film thickness, and the area of the island portions in the region B are measured, and the ratio of the area of the island portions in the region B to the area of the region corresponding to the region B is calculated as the area ratio B of the island portions.

Diameter of Island Portion

In the conductive member according to the present exemplary embodiment, the diameter of the island portion in the cross-section of the surface layer (the cross-section of any one of the region A or the region B) is, for example, preferably 100 nm or more and 750 nm or less, more preferably 150 nm or more and 650 nm or less, still more preferably 200 nm or more and 600 nm or less, and still more preferably 300 nm or more and 400 nm or less.

The diameter of the island portion is a value measured as follows.

A cut sample of the surface layer cut in a thickness direction using a cryomicrotome method is prepared. In the cut sample, a cut surface of the surface layer cut using a cryomicrotome method is observed with a scanning electron microscope. Any ten island portions are selected. Regarding each of the ten island portions, the maximum length (a so-called major axis length) of a line drawn between any two points on a contour line of the island portion is measured, and the average value of the ten major axis lengths is obtained as the diameter (nm) of the island portion.

Surface Roughness Rz of Outer Peripheral Surface of Surface Layer

A surface roughness Rz of an outer peripheral surface of the surface layer may be 8.0 μm or less.

In the related art, in a case where the surface roughness Rz of the outer peripheral surface of the surface layer is more than 5.0 μm, fogging is likely to occur. However, in the conductive member according to the present exemplary embodiment, in a case where the surface roughness Rz of the outer peripheral surface of the surface layer is more than 5.0 μm, the occurrence of fogging is suppressed as long as the surface roughness Rz is 8.0 μm or less.

The surface roughness Rz is measured by using a contact-type surface roughness measuring device (SURFCOM 570A, manufactured by Tokyo Seimitsu Co., Ltd.) and a contact needle with a diamond tip (5 μmR, 90° C. one) in an environment of a temperature of 23° C. and a relative humidity of 55%. The measured distance is 2.5 mm, and the measurement portion ranges from a position of 5 mm to a position of 7.5 mm from a terminal of a discharge region. The measurement is performed at four positions in units of 90 degrees in a circumferential direction of the roll-shaped charging member and at both ends of the discharge region, and the average value of the measured values at a total of eight positions is calculated.

Thickness of Surface Layer

The thickness of the surface layer is, for example, preferably 3 μm or more and 25 μm or less, more preferably 5 μm or more and 20 μm or less, and still more preferably 6 μm or more and 15 μm or less.

The thickness of the surface layer is measured by cutting the surface layer in the thickness direction and observing the obtained cross-section with an optical microscope.

Average Current Value of Conductive Member

From the viewpoint of suppressing the occurrence of color streaks, an average current value of the conductive member according to the present exemplary embodiment is, for example, preferably $1.0\times10^6$ μA or more, more preferably $1.5\times10^6$ μA or more, and still more preferably $2.0\times10^6$ μA or more.

Note that, from the viewpoint of current leakage, the average current value of the conductive member may be, for example, $5.0\times10^6$ μA.

A method of measuring the average current value is as follows.

After leaving the conductive member to stand in an environment having a temperature of 23±2° C. and a relative humidity of 50±5% for 24 hours, the same measurement is performed in the same environment. Measurement positions are a total of 12 positions including 3 positions (positions near both ends and the center portion) in the axial direction of the conductive member and 4 positions in units of 90° in the circumferential direction, and a measurement range of each of the measurement positions is a 50 μm×50 μm square (square having two sides parallel to each other in the axial direction of the conductive member) in the outer peripheral surface of the surface layer. A conical probe (formed of tungsten) having a tip diameter of 20 nm is brought into contact with the outer peripheral surface of the surface layer, 3 V is applied between the outer peripheral surface and the substrate, and the conical probe moves at a speed of 1 μm/sec in the axial direction of the conductive member to measure the current value. While shifting the conical probe in the circumferential direction of the conductive member, the measurement is repeated to measure the current value in the entire 50 square μm region.

In the above-described measurement, a total current amount flowing through the entire 50 square μm range is obtained, and the total current amounts of all of the measurement positions (12 positions) are averaged to obtain the average current value (μA).

Method of Manufacturing Conductive Member

One example of a method of manufacturing the conductive member according to the present exemplary embodiment will be described below.

A roll-shaped member in which the elastic layer is provided on an outer peripheral surface of a cylindrical or columnar substrate is prepared. A method of manufacturing the roll-shaped member is not particularly limited. For example, a method of winding a mixture containing a rubber material and optionally further containing a conductive agent and other additives around the substrate and heating and vulcanizing the mixture to form the elastic layer can be used.

A method of providing the surface layer on the outer peripheral surface of the elastic layer is not particularly limited, and it is preferable that a dispersion liquid in which the first resin, the second resin, and the conductive agent are dissolved and dispersed in a solvent is applied to the outer peripheral surface of the elastic layer and the applied dispersion liquid is dried and provided. Examples of a method of applying the dispersion liquid include a blade coating method, a wire bar coating method, a spray coating method, a dip coating method, a bead coating method, an air knife coating method, and a curtain coating method.

By applying the dispersion liquid to the outer peripheral surface of the elastic layer and adjusting a dew point of an environment in the step of drying the applied dispersion liquid to be 12° C. or higher and 18° C. or lower, the conductive member according to the present exemplary embodiment is obtained. Typically, the dew point of the environment in the step of drying the applied dispersion liquid is about 5° C.

Use of Conductive Member

The conductive member according to the present exemplary embodiment is used for, for example, a charging roll for charging a surface of the image carrier in an electrophotographic copier, an electrostatic printer, or the like, a transfer roll for transferring a toner image formed on the image carrier to a transfer medium, a toner transport roll for transporting toner to the image carrier, a conductive roll for power feeding or driving in combination with a conductive belt that electrostatically transports paper, or a cleaning roll for removing toner on the image carrier. In addition, in an ink jet type image forming apparatus, for example, a charging roll for charging an intermediate transfer medium before discharging ink from an ink jet head is used.

Hereinabove, the configuration of the conductive member 121A that is the roll-shaped member is described as the conductive member according to the present exemplary embodiment. However, the conductive member according to the present exemplary embodiment is not limited to this configuration and may be an endless belt-shaped member or a sheet-shaped member.

In addition, the conductive member according to the present exemplary embodiment may have a configuration in which, for example, an adhesive layer (primer layer) that is provided between the substrate and the elastic layer, a resistance adjusting layer or a transition preventing layer that is provided between the elastic layer and the surface layer, or a coating layer (protective layer) that is provided on an outer side (outermost surface) of the surface layer is provided.

Charging Device, Image Forming Apparatus, and Process Cartridge

A charging device according to the present exemplary embodiment includes the conductive member according to the present exemplary embodiment.

It is preferable that the charging device according to the present exemplary embodiment includes, for example, the conductive member according to the present exemplary embodiment, in which an image carrier is charged using a contact charging method.

A contact width of the conductive member with the image carrier in a circumferential direction (that is, a width of the conductive member in the circumferential direction in a region where the image carrier and the conductive member are in contact with each other) is not particularly limited and is, for example, in a range of 0.5 mm or more and 5 mm or less and preferably in a range of 1 mm or more and 3 mm or less.

A process cartridge according to the present exemplary embodiment includes, for example, a charging device that is attached to and detached from an image forming apparatus having a configuration described below and charges a surface of the image carrier. As the charging device, the charging device according to the present exemplary embodiment is applied.

Optionally, the process cartridge according to the present exemplary embodiment may further include, for example, at least one kind selected from the group consisting of an image carrier, an electrostatic latent image forming device that forms an electrostatic latent image on the charged surface of the image carrier, a developing device that develops the latent image formed on the surface of the image carrier with toner to form a toner image, a transfer device that transfers the toner image formed on the surface of the image carrier to a recording medium, and a cleaning device that cleans the surface of the image carrier.

The image forming apparatus according to the present exemplary embodiment includes: an image carrier; a charging device that charges a surface of the image carrier; an electrostatic latent image forming device that forms an electrostatic latent image on the charged surface of the image carrier; a developing device that develops the electrostatic latent image formed on the surface of the image carrier with a developer containing toner to form a toner image; and a transfer device that transfers the toner image to a surface of a recording medium. As the charging device, the charging device according to the present exemplary embodiment is applied.

Next, the image forming apparatus and the process cartridge according to the present exemplary embodiment will be described with reference to the drawings.

Figure 3:
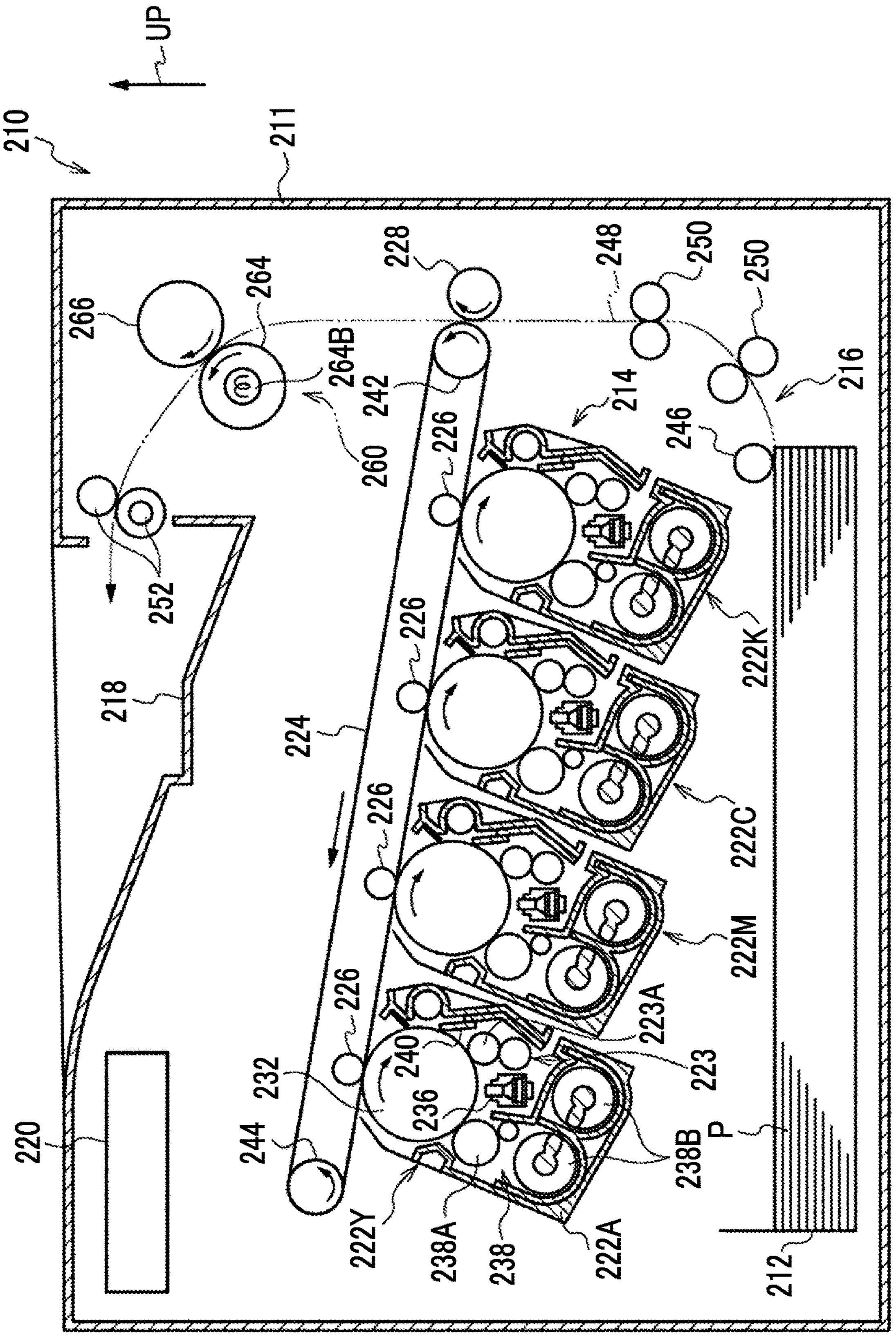
FIG. 3 is a schematic configuration diagram showing one example of an image forming apparatus according to an exemplary embodiment.

FIG. 3 is a schematic configuration diagram showing the image forming apparatus according to the present exemplary embodiment. Arrow UP shown in the drawing indicates an upward side in the vertical direction.

As shown in FIG. 3, an image forming apparatus 210 includes an image forming apparatus body 211 that accommodates each of the components. In the image forming apparatus body 211, an accommodation portion 212 that accommodates a recording medium P such as paper, an image forming portion 214 that forms an image on the recording medium P, a transport portion 216 that transports the recording medium P from the accommodation portion 212 to the image forming portion 214, and a controller 220 that controls an operation of each of the portions of the image forming apparatus 210 are provided. In addition, a discharge portion 218 to which the recording medium P on which the image is formed by the image forming portion 214 is discharged is provided above the image forming apparatus body 211.

The image forming portion 214 includes: image forming units 222Y, 222M, 222C, and 222K (hereinafter referred to as "222Y to 222K") that form toner images of colors including yellow (Y), magenta (M), cyan (C), and black (K), respectively; an intermediate transfer belt 224 (an example of a transfer target) to which the toner images formed by the image forming units 222Y to 222K are transferred; a first transfer roll 226 (an example of a transfer roll) that transfers the toner images formed by the image forming units 222Y to 222K to the intermediate transfer belt 224; and a second transfer roll 228 (an example of a transfer member) that transfers the toner images transferred to the intermediate transfer belt 224 by the first transfer roll 226 from the intermediate transfer belt 224 to the recording medium P. The image forming portion 214 is not limited to the above-described configuration and may adopt another configuration as long as an image can be formed on the recording medium P (an example of a transfer target).

Here, a unit consisting of the intermediate transfer belt 224, the first transfer roll 226, and the second transfer roll 228 corresponds to an example of the transfer device. This unit may be configured as a cartridge (process cartridge).

The image forming units 222Y to 222K are disposed side by side in a center portion in a vertical direction of the image forming apparatus 210 in a state where the image forming units 222Y to 222K are inclined with respect to a horizontal direction. In addition, each of the image forming units 222Y to 222K includes a photoreceptor 232 (an example of the image carrier) that rotates in one direction (for example, a clockwise direction in FIG. 3). The image forming units 222Y to 222K have the same configuration. Therefore, reference numerals of the units of the image forming units 222M, 222C, and 222K are not shown in FIG. 3.

In the vicinity of each of the photoreceptors 232, in order from the upstream side in the rotation direction of the photoreceptor 232, a charging device 223 including a charging roll 223A (an example of a charging member) that charges the photoreceptor 232, an exposure device 236 (an example of the electrostatic latent image forming device) that exposes the photoreceptor 232 charged by the charging device 223 to form an electrostatic latent image on the photoreceptor 232, a developing device 238 that develops the latent image formed on the photoreceptor 232 by the exposure device 236 to form a toner image, and a removal member (for example, a cleaning blade) 240 that comes into contact with the photoreceptor 232 and removes toner remaining on the photoreceptor 232 are provided.

Here, the photoreceptor 232, the charging device 223, and the exposure device 236, the developing device 238, and the removal member 240 are integrally held by a housing (case) 222A to configure a cartridge (process cartridge).

As the exposure device 236, a self-scanning LED print head is applied. The exposure device 236 may be an optical exposure device that exposes the photoreceptor 232 from a light source through a polygon mirror.

The exposure device 236 forms a latent image based on an image signal transmitted from the controller 220. Examples of the image signal transmitted from the controller 220 include an image signal acquired from an external device by the controller 220.

The developing device 238 includes: a developer supply member 238A that supplies a developer to the photoreceptor 232; and a plurality of transport members 238B that transport the developer given to the developer supply member 238A while agitating the developer.

The intermediate transfer belt 224 is formed in an annular shape and is disposed above the image forming units 222Y to 222K. On an inner peripheral side of the intermediate transfer belt 224, winding rolls 242 and 244 around which the intermediate transfer belt 224 is wound are provided. Any one of the winding rolls 242 and 244 rotates such that intermediate transfer belt 224 circulates and moves (rotates) in one direction (for example, a counterclockwise direction in FIG. 3) while being in contact with the photoreceptor 232. The winding roll 242 is configured as a facing roll that faces the second transfer roll 228.

The first transfer roll 226 faces the photoreceptor 232 with the intermediate transfer belt 224 interposed therebetween. A position between the first transfer roll 226 and the photoreceptor 232 is a first transfer position at which the toner image formed on the photoreceptor 232 is transferred to the intermediate transfer belt 224.

The second transfer roll 228 faces the winding roll 242 with the intermediate transfer belt 224 interposed therebetween. A position between the second transfer roll 228 and the winding roll 242 is a second transfer position at which the toner image transferred to the intermediate transfer belt 224 is transferred to the recording medium P.

In the transport portion 216, a feed roll 246 that feeds the recording medium P accommodated in the accommodation portion 212, a transport path 248 through which the recording medium P fed by the feed roll 246 is transported, and a plurality of transport rolls 250 that are provided along the transport path 248 and transport the recording medium P fed by the feed roll 246 to the second transfer position are provided.

A fixing device 260 that fixes the toner image formed on the recording medium P by the image forming portion 214 to the recording medium P is provided downstream of the second transfer position in the transport direction.

In the fixing device 260, a heating roll 264 that heats the image on the recording medium P and a pressurization roll 266 that is an example of a pressurization member are provided. In the heating roll 264, a heating source 264B is provided.

A discharge roll 252 that discharges the recording medium P to which the toner image is fixed to the discharge portion 218 is provided downstream of the fixing device 260 in the transport direction.

Next, in the image forming apparatus 210, an image forming operation of forming an image on the recording medium P will be described.

In the image forming apparatus 210, the recording medium P transported from the accommodation portion 212 to the feed roll 246 is transported to the second transfer position by the plurality of transport rolls 250.

On the other hand, in each of the image forming units 222Y to 222K, the photoreceptor 232 charged by the charging device 223 is exposed by the exposure device 236 to form a latent image on the photoreceptor 232. The latent image is developed by the developing device 238 to form a toner image on the photoreceptor 232. The toner images of the colors formed by the image forming units 222Y to 222K overlap each other on the intermediate transfer belt 224 at the first transfer position such that a color image is formed. The color image formed on the intermediate transfer belt 224 is transferred to the recording medium P at the second transfer position.

The recording medium P to which the toner image is transferred is transported to the fixing device 260, and the transferred toner image is fixed by the fixing device 260. The recording medium P to which the toner image is fixed is discharged to the discharge portion 218 by the discharge roll 252. As described above, the series of image forming operations are performed.

The image forming apparatus 210 according to the present exemplary embodiment is not limited to the above-described configuration. For example, well-known image forming apparatus such as a direct transfer type image forming apparatus that directly transfers the toner image formed on each of the photoreceptors 232 of the image forming units 222Y to 222K to the recording medium P may be adopted.

EXAMPLES

Hereinafter, Examples of the present invention will be described, but the present invention is not limited to these Examples. In the following description, unless specified otherwise, "part(s)" and "%" represent "part(s) by mass" and "mass %".

Example 1: Preparation of Conductive Member

Formation of Elastic Layer 15 parts by mass of a conductive agent (carbon black, ASAHI THERMAL manufactured by Asahi Carbon Co., Ltd.), 1 part by mass of a vulcanizing agent (sulfur, 200-mesh, manufactured by Tsurumi Chemical Industry Co., Ltd.) as an additive to be blended in the elastic layer, and 2.0 parts by mass of a vulcanization accelerator (NOCCELER DM, manufactured by Ouchi Shinko Chemical Industrial Co., Ltd.) as another additive to be blended in the elastic layer are added to 100 parts by mass of an elastic material (epichlorohydrin-ethylene oxide-allyl glycidyl ether copolymer rubber) to obtain a mixture, and the mixture is kneaded in an open roll to obtain a composition for forming an elastic layer. The composition for forming an elastic layer is wound around an outer peripheral surface of a shaft (substrate) having a diameter of 8 mm formed of SUS 303 using a press forming machine through an adhesive layer, is put into a furnace at a temperature of 180° C., and is heated for 30 minutes to form an elastic layer having a thickness of 3.5 mm on the shaft. The outer peripheral surface of the elastic layer is polished to obtain a conductive elastic roll having a diameter of 14 mm that includes the elastic layer having a thickness of 3.0 mm.

Formation of Surface Layer 15 parts by mass of a composition (hereinafter, referred to as "specific composition") consisting of 76 parts by mass of a polyamide resin (N-methoxymethylated nylon, manufactured by Nagase ChemteX Corporation/F30K) as a first resin, 24 parts by mass of a polyvinyl butyral resin (SLEC BL-1/manufactured by Sekisui Chemical Co., Ltd.) as a second resin, 13 parts by mass of carbon black (MONARCH 1000/manufactured by Cabot Corporation) as a conductive agent, 10 parts by mass of a porous polyamide filler (ORGASOL 2001 UD NAT1/manufactured by Arkema S.A.), 1.0 part by mass of an acid catalyst (NACURE 4167/manufactured by King Industries, Inc.), and 1 part by mass of a leveling agent (polyether modified polydimethylsiloxane (BYK 307/manufactured by BYK) as a polyether modified polysiloxane) is diluted with 85 parts by mass of methanol and is dispersed with a bead mill to obtain a dispersion liquid. In an environment having a temperature of 24° C. and a dew point of 15° C., the outer peripheral surface of the elastic layer of the conductive elastic roll is dipped in the obtained dispersion liquid, is dried with wind, and is heated at 140° C. for 30 minutes for crosslinking to form a surface layer having a thickness of 10 μm. As a result, a conductive member is obtained.

Examples 2 to 12 and Comparative Examples 1 to 8

Conductive members are obtained using the same method as the method of Example 1, except that the amount (part(s)) of the first resin, the amount (part(s)) of the second resin, the amount (part(s)) of the leveling agent, the amount of the filler, and the dew point of the application and drying are changed as shown in Table 1 during the formation of the surface layer.

Abbreviations in Table 1 are as described below.

First Resin

PA1: a polyamide resin (manufactured by Nagase ChemteX Corporation/F30K)

Second Resin

PVB1: a polyvinyl butyral resin (SLEC BM-1/manufactured by Sekisui Chemical Co., Ltd.)

The following characteristics of the conductive member obtained in each of the examples are measured using the methods described above. The obtained results are listed in Table 1.

"Area A of Island Portions"

"Area B of Island Portions"

"Average Current Value"

"Surface Roughness Rz of Outer Peripheral Surface of Surface Layer"

Evaluation

Evaluation of Color Streaks

The conductive member obtained in Example or Comparative Example as a charging roll of a charging device is incorporated into a modified machine of an image forming apparatus (DocuCentre-V C7776, manufactured by Fujifilm Business Innovation Corporation), and 5000 A4 images having an image density of 30% are printed under conditions of 28° C. and 85% RH. The level of color streaks that occur after printing 5000 sheets and extend in the axial direction of the photoreceptor is evaluated based on G0 to G3. G0 to G2 are levels where there are no problems in use. Table 2 shows the evaluation results.

- G0: the occurrence of color streaks extending in the axial direction of the photoreceptor is not recognized.
- G0.5: the number of color streaks extending in the axial direction of the photoreceptor is 1 or less.
- G1: the number of color streaks extending in the axial direction of the photoreceptor is 2 or more and 4 or less.
- G1.5: the number of color streaks extending in the axial direction of the photoreceptor is 5 or more and 7 or less.
- G2: the number of color streaks extending in the axial direction of the photoreceptor is 8 or more and 10 or less.
- G2.5: the number of color streaks extending in the axial direction of the photoreceptor is 11 or more and 13 or less.
- G3: the number of color streaks extending in the axial direction of the photoreceptor is 14 or more.

Evaluation of Fogging

In a case where the same image formation as in the evaluation of color streaks is performed and the 5000th printed paper is observed, a case where fogging does not occur is evaluated as "OK", and a case where fogging occurs is evaluated as "NG".

Evaluation of Strength

In an MIT test, the strength of the surface layer is evaluated.

The MIT test is performed according to JIS P 8115:2001 (MIT testing method).

Specifically, a strip-shaped test piece (the thickness of the test piece is the thickness of the surface layer) having a width of 15 mm and a length of 200 mm in the circumferential direction is cut out from the surface layer of the conductive member. Opposite ends of the strip-shaped test piece are fixed, a tensile force of 1 kgf is applied to repeatedly bend (fold) the test piece in a horizontal 90° direction using a clamp having a curvature radius R of 0.05 as a support. In this case, in a case where the strip-shaped test piece is fractured, the number of times the test piece is bent is obtained as a folding endurance number, and the strength is evaluated based on the folding endurance number according to the following evaluation criteria.

The MIT test is performed in an environment of a temperature of 22° C. and a humidity of 55% RH.

The evaluation is performed based on G0 to G2. Table 1 shows the evaluation results.

G0: the folding endurance number is 100000 or more.

G1: the folding endurance number is 50000 or more and less than 100000.

G2: the folding endurance number is 10000 or more and less than 50000.

G3: the folding endurance number is less than 10000.

TABLE

| | First Layer | | Second Resin | | Dew Point Temperature of Application and Drying | Amount of Leveling | Amount | Area Ratio A of Island Portions in |
|---|---|---|---|---|---|---|---|---|
| | Kind | Amount (Part(s)) | Kind | Amount (Part(s)) | Environment (° C.) | Agent (Part(s)) | of Filler (Part(s)) | Region A (%) |
| Example 1 | PA1 | 76 | PVB1 | 24 | 12 | 1 | 10 | 25 |
| Example 2 | PA1 | 76 | PVB1 | 24 | 16 | 1 | 10 | 36 |
| Example 3 | PA1 | 76 | PVB1 | 24 | 19 | | 10 | 45 |
| Comparative Example 1 | PA1 | 76 | PVB1 | 24 | 10 | 1 | 10 | 20 |
| Comparative Example 1 | PA1 | 76 | PVB1 | 24 | 20 | 1 | 10 | 50 |
| Example 4 | PA1 | 76 | PVB1 | 24 | 12.5 | 1 | 10 | 28 |
| Example 5 | PA1 | 76 | PVB1 | 24 | 13.5 | 1 | 10 | 33 |
| Example 6 | PA1 | 76 | PVB1 | 24 | 17.5 | 1 | 10 | 37 |
| Example 7 | PA1 | 76 | PVB1 | 24 | 18.5 | 1 | 10 | 42 |
| Example 8 | PA1 | 76 | PVB1 | 24 | 18.7 | 1 | 10 | 43 |
| Comparative Example 3 | PA1 | 76 | PVB1 | 24 | 19.5 | 1 | 10 | 48 |
| Example 9 | PA1 | 76 | PVB1 | 24 | 13.8 | 1 | 10 | 34 |
| Example 10 | PA1 | 76 | PVB1 | 24 | 18 | 1 | 10 | 41 |
| Comparative Example 4 | PA1 | 90 | PVB1 | 10 | 12 | 1 | 10 | 20 |
| Comparative Example 5 | PA1 | 90 | PVB1 | 10 | 12 | 1 | 15 | 20 |
| Comparative Example 6 | PA1 | 76 | PVB1 | 24 | 5 | 1 | 10 | 10 |
| Comparative Example 7 | PA1 | 70 | PVB1 | 30 | 5 | 1 | 10 | 15 |
| Comparative Example 8 | PA1 | 60 | PVB1 | 40 | 5 | 1 | 10 | 20 |

| | Area Ratio B of Island Portions in | Area Ratio of Island Portions | Average Current | Roughness | Image Evaluation | | |
|---|---|---|---|---|---|---|---|
| | Region A (%) | [A − B] (%) | Value (μm) | Rz (μm) | Color Streaks | Fogging | Strength Evaluation |
| Example 1 | 40 | 15 | $1.0 \times 10^6$ | 7.0 | G1 | OK | G0 |
| Example 2 | 45 | 9 | $1.5 \times 10^6$ | 7.5 | G0 | OK | G0 |
| Example 3 | 50 | 5 | $2.0 \times 10^6$ | 8.0 | G0 | OK | G1 |
| Comparative Example 1 | 38 | 18 | $5.5 \times 10^6$ | 5.0 | G2.5 | OK | G0 |
| Comparative Example 1 | 54 | 4 | $2.2 \times 10^6$ | 9.0 | G0 | OK | G3 |
| Example 4 | 42 | 14 | $1.2 \times 10^6$ | 7.0 | G1 | OK | G0 |
| Example 5 | 43 | 10 | $1.4 \times 10^6$ | 7.5 | G0.5 | OK | G0 |
| Example 6 | 44 | 7 | $1.8 \times 10^6$ | 7.5 | G0 | OK | G0 |
| Example 7 | 47 | 5 | $1.9 \times 10^6$ | 7.5 | G0 | OK | G1 |
| Example 8 | 48 | 5 | $1.9 \times 10^6$ | 8.0 | G0.5 | OK | G1 |
| Comparative Example 3 | 52 | 4 | $2.1 \times 10^6$ | 8.0 | G0 | OK | G2 |
| Example 9 | 44 | 10 | $1.4 \times 10^6$ | 7.5 | G0.5 | OK | G0 |
| Example 10 | 46 | 5 | $1.6 \times 10^6$ | 7.5 | G0 | OK | G1 |
| Comparative Example 4 | 37 | 17 | $7.5 \times 10^6$ | 6.0 | G2.5 | NG | G0 |
| Comparative Example 5 | 37 | 17 | $7.5 \times 10^6$ | 8.5 | G2.5 | NG | G0 |
| Comparative Example 6 | 32 | 22 | $4.5 \times 10^6$ | 4.5 | G3 | OK | G0 |

TABLE-continued

| | | | | | | | |
|---|---|---|---|---|---|---|---|
| Comparative Example 7 | 37 | 22 | $8.0 \times 10^6$ | 5.5 | G2.5 | NG | G2 |
| Comparative Example 8 | 40 | 20 | $1.1 \times 10^6$ | 5.5 | G0 | OK | G3 |

It can be seen from the results that, in the conductive member according to Examples, the mechanical strength is ensured, and the occurrence of color streaks is suppressed.

The present exemplary embodiment includes the following aspects.

(((1)))

A conductive member comprising:

a substrate;

an elastic layer provided on the substrate; and a surface layer provided on the elastic layer, wherein the surface layer contains a conductive agent and has a sea/island structure that consists of a sea portion containing a first resin and an island portion containing a second resin, and in observation of a cross-section of the surface layer, an area ratio A of island portions in a region A from a surface of the surface layer to a depth that is 20% of a film thickness is 25% or more and 45% or less.

(((2)))

The conductive member according to (((1))), wherein the area ratio A of the island portions is 30% or more and 40% or less.

(((3)))

The conductive member according to (((1))) or (((2))), wherein in the observation of the cross-section of the surface layer, an area ratio B of island portions in a region B from the surface of the surface layer to a depth that is more than 20% of the film thickness is 40% or more and 50% or less.

(((4)))

The conductive member according to (((3))), wherein the area ratio B of the island portions is 45% or more and 50% or less.

(((5)))

The conductive member according to any one of (((1))) to (((4))), wherein an absolute value of a difference between the area ratio A of the island portions and the area ratio B of the island portions is within 15%.

(((6)))

The conductive member according to (((5))), wherein the absolute value of the difference between the area ratio A of the island portions and the area ratio B of the island portions is within 10%.

(((7)))

The conductive member according to any one of (((1))) to (((6))), wherein an average current value is $1.0\times10^6$ µA or more.

(((8)))

The conductive member according to any one of (((1))) to (((7))), wherein a surface roughness Rz of an outer peripheral surface of the surface layer is 8.0 µm or less.

(((9)))

The conductive member according to any one of (((1))) to (((8))), wherein in the observation of the cross-section of the surface layer, an area ratio B of island portions in a region B from the surface of the surface layer to a depth that is more than 20% of the film thickness is 40% or more and 50% or less, and an absolute value of a difference between the area ratio A of the island portions and the area ratio B of the island portions is within 15%.

(((10)))

A charging device comprising:

the conductive member according to any one of (((1))) to (((9))).

(((11)))

A process cartridge comprising:

the charging device according to (((10))), wherein the process cartridge is attached to and detached from an image forming apparatus.

(((12)))

An image forming apparatus comprising:

an image carrier;

the charging device according to (((10))) that charges a surface of the image carrier;

an electrostatic latent image forming device that forms an electrostatic latent image on the charged surface of the image carrier;

a developing device that develops the electrostatic latent image formed on the surface of the image carrier with a developer containing toner to form a toner image; and a transfer device that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A conductive member comprising:

a substrate;

an elastic layer provided on the substrate; and a surface layer provided on the elastic layer, wherein the surface layer contains a conductive agent and has a sea/island structure that consists of a sea portion containing a first resin and an island portion containing a second resin, and in observation of a cross-section of the surface layer, an area ratio A of island portions in a region A from a surface of the surface layer to a depth that is 20% of a film thickness is 25% or more and 45% or less.

2. The conductive member according to claim 1, wherein the area ratio A of the island portions is 30% or more and 40% or less.

3. The conductive member according to claim 1, wherein in the observation of the cross-section of the surface layer, an area ratio B of island portions in a region B from the surface of the surface layer to a depth that is more than 20% of the film thickness is 40% or more and 50% or less.

4. The conductive member according to claim 3, wherein the area ratio B of the island portions is 45% or more and 50% or less.

5. The conductive member according to claim 1, wherein an absolute value of a difference between the area ratio A of the island portions and an area ratio B of island portions is within 15%.

6. The conductive member according to claim 5, wherein the absolute value of the difference between the area ratio A of the island portions and the area ratio B of the island portions is within 10%.

7. The conductive member according to claim 1, wherein an average current value is $1.0\times10^{6}$ μA or more.

8. The conductive member according to claim 1, wherein a surface roughness Rz of an outer peripheral surface of the surface layer is 8.0 μm or less.

9. The conductive member according to claim 1, wherein in the observation of the cross-section of the surface layer, an area ratio B of island portions in a region B from the surface of the surface layer to a depth that is more than 20% of the film thickness is 40% or more and 50% or less, and an absolute value of a difference between the area ratio A of the island portions and the area ratio B of the island portions is within 15%.

10. A charging device comprising:
the conductive member according to claim 1.

11. A charging device comprising:
the conductive member according to claim 2.

12. A charging device comprising:
the conductive member according to claim 3.

13. A charging device comprising:
the conductive member according to claim 4.

14. A charging device comprising:
the conductive member according to claim 5.

15. A charging device comprising:
the conductive member according to claim 6.

16. A charging device comprising:
the conductive member according to claim 7.

17. A charging device comprising:
the conductive member according to claim 8.

18. A charging device comprising:
the conductive member according to claim 9.

19. A process cartridge comprising:
the charging device according to claim 10,
wherein the process cartridge is attached to and detached from an image forming apparatus.

20. An image forming apparatus comprising:
an image carrier;
the charging device according to claim 10 that charges a surface of the image carrier;
an electrostatic latent image forming device that forms an electrostatic latent image on the charged surface of the image carrier;
a developing device that develops the electrostatic latent image formed on the surface of the image carrier with a developer containing toner to form a toner image; and
a transfer device that transfers the toner image to a surface of a recording medium.

* * * * *